United States Patent
Saviano

(10) Patent No.: US 6,875,937 B1
(45) Date of Patent: Apr. 5, 2005

(54) RECESSED ELECTRICAL OUTLET ASSEMBLY

(76) Inventor: Thomas A. Saviano, P.O. Box 568, Pescadero, CA (US) 94060

( * ) Notice: Subject to any disclaimer, the term of this patent is extended or adjusted under 35 U.S.C. 154(b) by 0 days.

(21) Appl. No.: 10/741,902

(22) Filed: Dec. 19, 2003

(51) Int. Cl.[7] .................................................. H01H 9/02
(52) U.S. Cl. ...................................... 200/297; 200/267
(58) Field of Search ........................... 200/267; 174/53, 174/67, 58; 220/3.94, 4.02; 439/535, 536

(56) References Cited

U.S. PATENT DOCUMENTS

| | | | | |
|---|---|---|---|---|
| 3,863,021 A | * | 1/1975 | Schindler et al. ............. | 174/53 |
| 4,105,862 A | * | 8/1978 | Hoehn .......................... | 174/53 |
| 4,265,365 A | * | 5/1981 | Boteler ....................... | 220/3.3 |
| 4,715,507 A | * | 12/1987 | Chamberlin ............... | 220/3.94 |
| 4,936,794 A | | 6/1990 | Shaw et al. | |
| 4,947,281 A | * | 8/1990 | Boteler ........................ | 361/56 |
| 4,954,667 A | * | 9/1990 | Jorgensen et al. ........... | 174/53 |
| 4,983,785 A | * | 1/1991 | Johnston ...................... | 174/53 |
| 5,064,385 A | * | 11/1991 | Harlow, Jr. ................. | 439/535 |
| 5,170,014 A | * | 12/1992 | Borsh .......................... | 174/53 |
| 5,223,673 A | * | 6/1993 | Mason ......................... | 174/53 |
| 5,342,993 A | * | 8/1994 | Siems .......................... | 174/48 |
| 5,378,854 A | * | 1/1995 | Hoover ........................ | 174/53 |
| 5,471,012 A | * | 11/1995 | Opel ............................ | 174/53 |
| 5,486,650 A | * | 1/1996 | Yetter .......................... | 174/53 |
| 5,574,256 A | | 11/1996 | Cottone | |
| 5,594,205 A | * | 1/1997 | Cancellieri et al. ........... | 174/53 |
| 5,600,093 A | * | 2/1997 | Herth et al. .................. | 174/53 |
| 5,621,788 A | | 4/1997 | Eiken | |
| 5,770,817 A | * | 6/1998 | Lo ............................... | 174/57 |
| 5,936,199 A | * | 8/1999 | Lutz ............................ | 174/53 |
| 6,191,361 B1 | * | 2/2001 | Matty .......................... | 174/53 |
| 6,194,657 B1 | * | 2/2001 | Gretz .......................... | 174/53 |
| 6,737,576 B1 | * | 5/2004 | Dinh ............................ | 174/50 |
| 6,750,398 B1 | * | 6/2004 | Richardson .................. | 174/58 |
| 6,761,582 B1 | * | 7/2004 | Shotey et al. ............... | 439/536 |
| 6,770,815 B1 | * | 8/2004 | Shotey et al. ................. | 174/66 |
| 6,774,307 B2 | * | 8/2004 | Kruse et al. .................. | 174/53 |

* cited by examiner

Primary Examiner—Elvin Enad
Assistant Examiner—Lisa Klaus
(74) Attorney, Agent, or Firm—James F. Hann; Haynes Beffel & Wolfeld LLP

(57) ABSTRACT

A recessed electrical outlet installation comprises a wall an electrical outlet device box, an electrical outlet device and a cover plate. The wall defines a first open region behind an opening formed within the wallboard and a second open region located below the opening and behind the wallboard. The box is mounted to the wall and has a first portion and a recessed second portion, the first portion having an open front, the second portion recessed away from the open front. The first portion comprises outlet device mounting structure used to mount the electrical outlet device to and within the box. The second portion defines a wiring cavity sized to house wire junctions, the wire junctions electrically connected to the electrical outlet device. At least a substantial part of the first portion is positioned within the first open region. The second portion is positioned within the second open region. The cover plate comprises a flange portion extending laterally outwardly of the wall opening to lie adjacent to the wallboard and a recessed portion extending into the first portion of the box.

23 Claims, 3 Drawing Sheets

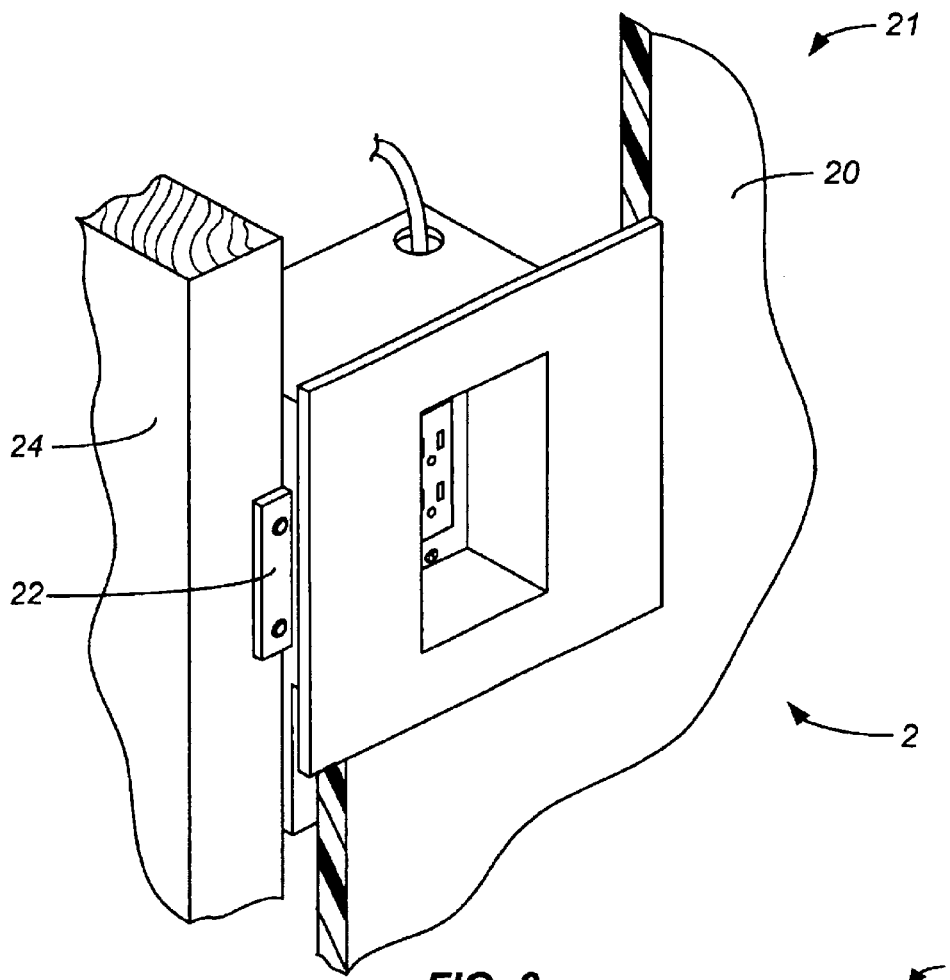
FIG. 3
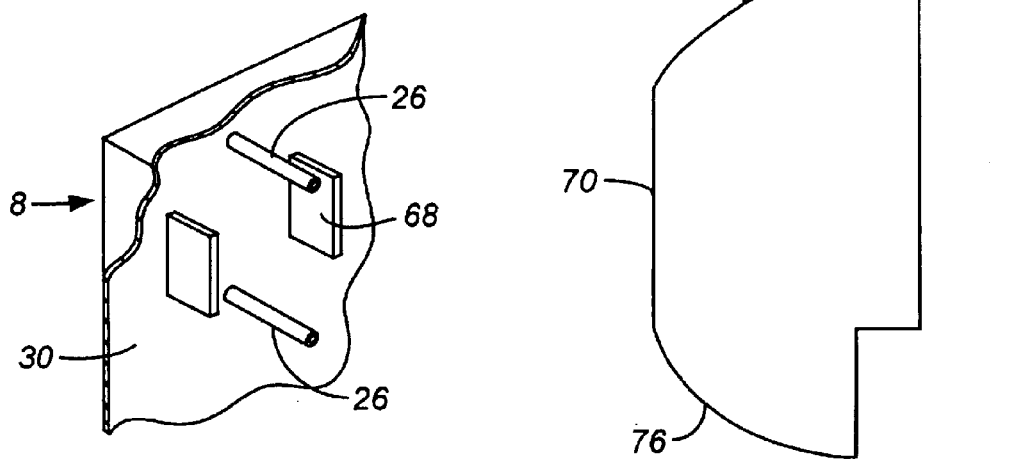
FIG. 4     FIG. 5

RECESSED ELECTRICAL OUTLET ASSEMBLY

CROSS-REFERENCE TO OTHER APPLICATIONS

None.

FEDERALLY SPONSORED RESEARCH OR DEVELOPMENT

None.

BACKGROUND OF THE INVENTION

Electrical outlet devices are often mounted to walls, ceilings and floors. There are a wide variety of electrical outlet devices, including electrical sockets, cable TV outlets, phone jack, switches, CAD system outlets, etc. To pass code requirements, the wiring to and from an electrical outlet device must be housed within an approved electrical outlet box. Most typically, the electrical outlet boxes are designed so that the outer surface of the electrical outlet device is generally flush with the mounting surface. On other occasions electrical outlet boxes may be designed so that the electrical outlet device is recessed. For example, clock outlets in walls and electrical outlets in floors are often recessed. However, the distance an electrical outlet device can be recessed is limited because of the need to leave room for the wire connections behind the electrical outlet device.

See U.S. Pat. Nos. 4,936,794; 5,574,256 and 5,621,788.

BRIEF SUMMARY OF THE INVENTION

A first aspect of the invention is directed to a recessed electrical outlet device box usable with an outlet device and a mountable within a wall, the wall of the type comprising wallboard defining open regions behind the wallboard. The box comprises a first portion and a recessed second portion. The first portion has an open front and the second portion is recessed away from the open front. The second portion defines a wiring cavity sized to house wire junctions. Outlet device mounting structure is located to permit an outlet device to be mounted within the box. The box is sized to permit at least a substantial part of the first portion to be positioned within a first open region behind an opening formed within wallboard of a wall. The open front is generally alignable with the opening in the wallboard. The second portion is positionable within a second open region, the second open region being located below the opening and behind the wallboard.

A second aspect of the invention is directed to a recessed electrical outlet enclosure usable with an outlet device and a mountable within a wall, the wall of the type comprising wallboard defining open regions behind the wallboard. The enclosure comprises an electrical outlet device box comprising a first portion and a recessed second portion. The first portion has an open front and the second portion is recessed away from the open front. The second portion defines a wiring cavity sized to house wire junctions. The enclosure also comprises outlet device mounting structure is located to permit an outlet device to be mounted within the box. The box is sized to permit at least a substantial part of the first portion to be positioned within a first open region behind an opening formed within wallboard of a wall. The open front is generally alignable with the opening in the wallboard. The second portion is positionable within a second open region, the second open region being located below the opening and behind the wallboard. The enclosure further comprises a cover plate comprising a flange portion and a recessed portion. The recessed portion is sized to pass through the open front of the first portion and into the first portion. The recessed portion has a base and sidewalls extending between the flange portion and the base. The flange portion is sized to extend laterally outwardly of the opening in the wall.

A third aspect of the invention is directed to a recessed electrical outlet assembly a mountable within a wall, the wall of the type comprising wallboard defining open regions behind the wallboard. The assembly comprises an electrical outlet device box comprising a first portion and a recessed second portion. The first portion has an open front and the second portion is recessed away from the open front. The first portion comprises outlet device mounting structure. The assembly also comprises an electrical outlet device mounted to the box and within the box through the outlet device mounting structure. The second portion defines a wiring cavity sized to house wire junctions, the wire junctions electrically connected to the electrical outlet device. The box is sized to permit at least a substantial part of the first portion to be positioned within a first open region behind an opening formed within wallboard of a wall. The open front is generally alignable with the opening in the wallboard. The second portion is positionable within a second open region, the second open region being located below the opening and behind the wallboard. The enclosure further comprises a cover plate comprising a flange portion and a recessed portion. The recessed portion is sized to pass through the open front of the first portion and into the first portion. The recessed portion has a base and sidewalls extending between the flange portion and the base. The flange portion is sized to extend laterally outwardly of the opening in the wall.

A fourth aspect of the invention is directed to a recessed electrical outlet installation comprising a wall, an electrical outlet device box, an electrical outlet device and a cover plate. The wall defines a first open region behind an opening formed within the wallboard and a second open region located below the opening and behind the wallboard. The electrical outlet device box is mounted to the wall and has a first portion and a recessed second portion, the first portion having an open front, the second portion recessed away from the open front. The first portion comprises outlet device mounting structure. The electrical outlet device is mounted to the box and within the box through the outlet device mounting structure. The second portion defines a wiring cavity sized to house wire junctions, the wire junctions electrically connected to the electrical outlet device. At least a substantial part of the first portion is positioned within the first open region. The open front is generally aligned with the opening in the wallboard. The second portion is positioned within the second open region. The cover plate comprises a flange portion and a recessed portion. The recessed portion is sized to pass through the open front of the first portion and into the first portion. The recessed portion has a base and sidewalls extending between the flange portion and the base. The flange portion is sized to extend laterally outwardly of the opening in the wall to lie adjacent to the wallboard. The base has an access opening to permit access to the electrical outlet device.

Various features and advantages of the invention will appear from the following description in which the preferred embodiments have been set forth in detail in conjunction with the accompanying drawings.

BRIEF DESCRIPTION OF THE DRAWINGS

FIG. 3 is an isometric view of the assembly of FIG. 2 with portions of the wallboard and stud broken away to illustrate how the assembly is mounted to the wall.

FIG. 4 is an isometric view of a part of the box with portions broken away to show the inside of the back wall of the box.

FIG. 5 is a side view of a portion of the box of FIGS. 1–3 showing how the back may be contoured to facilitate installation through an opening in the wallboard during, for example, a retrofit application.

DETAILED DESCRIPTION OF THE INVENTION

Figure 1:
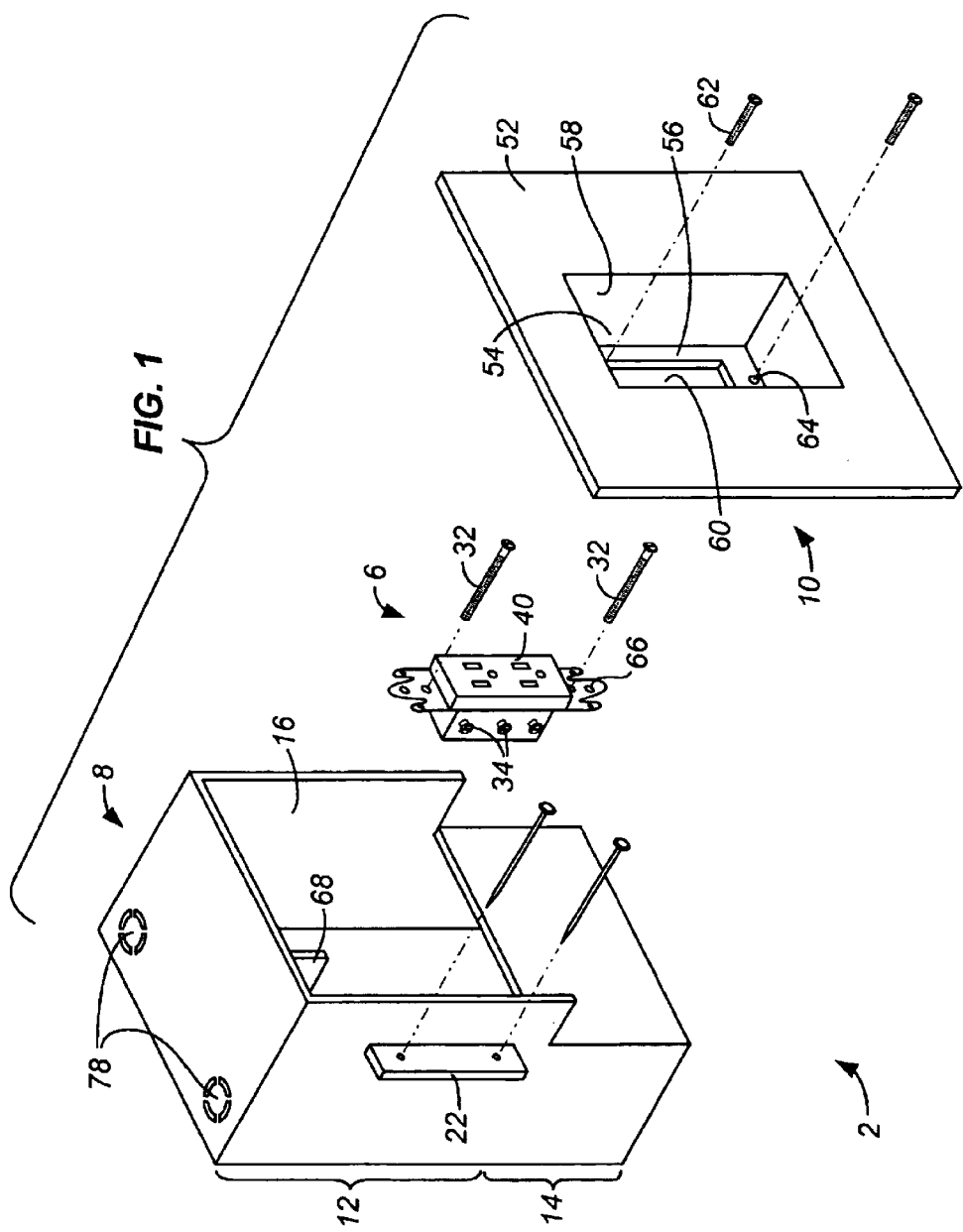
FIG. 1 is an exploded isometric view of a recessed electrical outlet assembly made according to the invention including an electrical outlet device box, a cover plate and an electrical outlet device.
Figure 2:
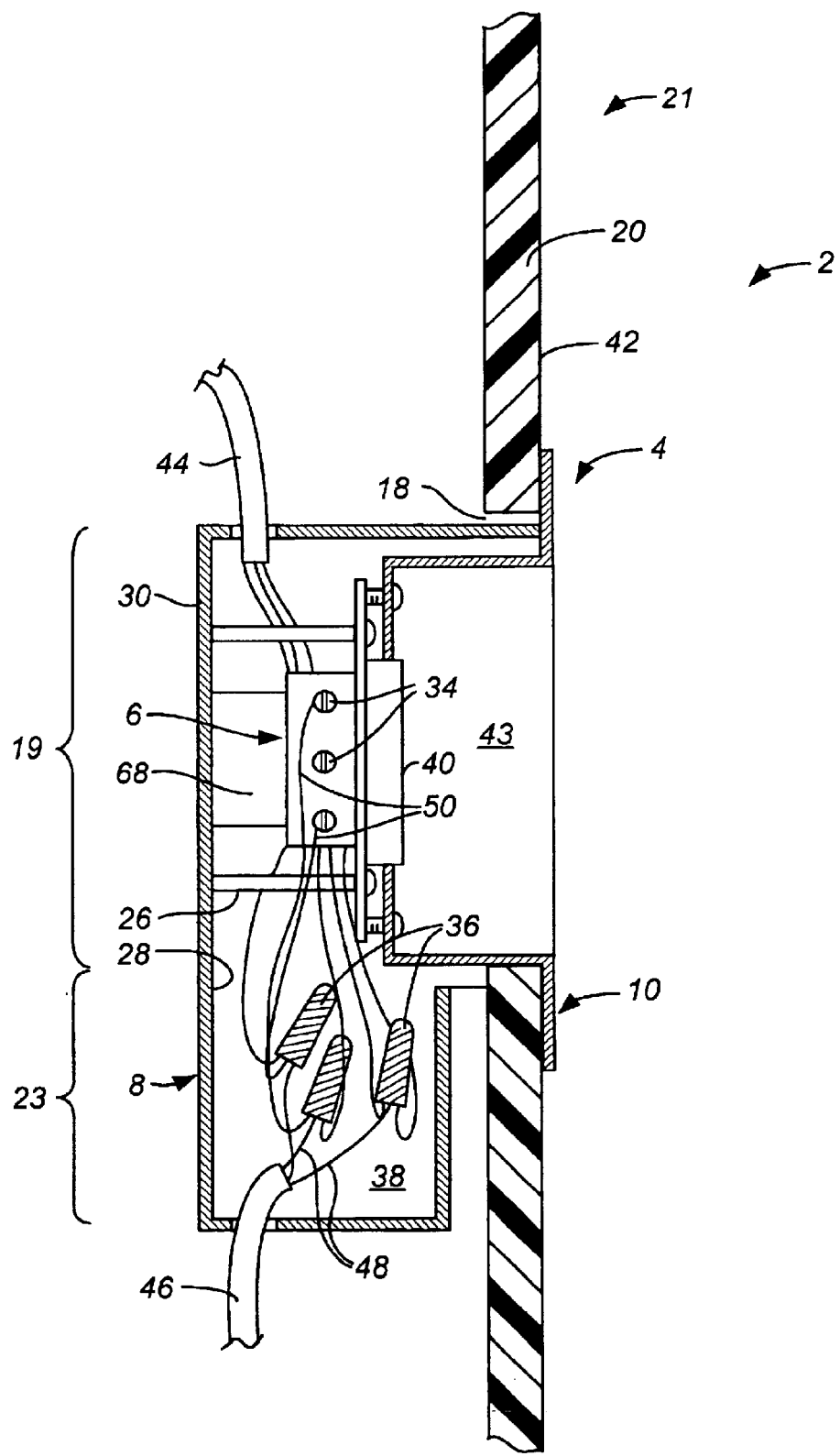
FIG. 2 is a cross-sectional view of the assembly of FIG. 1 as installed in a wall.

FIGS. 1 and 2 illustrate a recessed electrical outlet assembly 2 comprising broadly a recessed electrical outlet enclosure 4 and an electrical outlet device 6. Enclosure 4 comprises an electrical outlet device box 8 and a cover plate 10. Box 8 comprises a first portion 12 and a second, recessed portion 14. First portion 12 has an open front 16 sized to be somewhat smaller than a wallboard opening 18 openings formed in wallboard 20 of a wall 21. At least a substantial part of first portion 12 is housed within a first open region 19 within wall 21 behind opening 18. Second portion 14 is housed within a second open region 23 within wall 21; second open region 23 is located below opening 18 and behind wallboard 20. First and second portions 12, 14 define first and second volumes therein. The second volume within second portion 14 is preferably at least 20%, more preferably 25%, and even more preferably at least 30%, of the combined first and second volumes within first and second portions 12, 14. However, the minimum volume within second portion 14 is largely determined by the connection requirements of electrical outlet device 6.

Box 8 may be mounted to the wall in a conventional or unconventional manner. In the disclosed embodiment box 8 has a mounting flange 22 used to permit box 8 to be secured to a stud 24; see FIG. 3. This is typically used for new construction prior to installation of wallboard 20. If desired other types of mounting structure, such as clips on the top and bottom of box 8 used to hold nails which are then driven into the studs, can be used.

Box 8 has a pair of standoffs 26 extending from the inside surface 28 of the back wall 30 of box 8. Electrical outlet device 6 is mounted to the inside of box 8 using screws 32 which engage the threaded holes in standoffs 26. Electrical outlet device 6 is, in this embodiment, a conventional electrical outlet having electrical terminals 34 along each side. As seen in FIG. 2, device 6 is mounted close to back wall 30. However, the room necessary for wire junctions 36 is provided within a wiring cavity 38 defined within the second portion 14 of box 8. Because the wire junctions 36 need not be positioned behind electrical outlet device 6, as is typical with conventional recessed outlet device boxes, outer face 40 of electrical outlet device 6 may be positioned further back from the outer surface 42 of wallboard 20 than in a conventional device. This provides a larger-volume open region 43 within cover plate 10, and therefore more room for plugs or other connection devices, than would be available with a conventional recessed electrical outlet enclosure.

As can be seen in the figures, multiple conductor cables 44, 46 pass into and out of box 8 to provide wires 48 for appropriate connections within box 8, typically to wire junctions 36 within wiring cavity 38. Wire junctions 36 are also coupled to terminals 34 by other wires 50. Other wiring schemes can, of course, be used.

Cover plate 10 comprises a laterally extending flange portion 52 and a recessed portion 54. Recessed portion 54 comprises a base 56 and sidewalls 58 extending between the base and flange portion 52. Flange portion 52 is preferably sized to extend beyond the perimeter of wallboard opening 18 and lie adjacent to outer surface 42 of wallboard 20. Base 56 has an access opening 60 to permit user access to the outer face 40 of electrical outlet device 6. Cover plate 10 is secured to box 8 through the use of screws 62 which pass through corresponding openings 64 in base 56 and engage threaded holes 66 in electrical outlet device 6. Coverplate 10 could also be secured directly to box 8. In the preferred embodiment box 8 has a pair of side barriers 68 extending inwardly from inside surface 28 to lie on either side of electrical outlet device 6. Side barriers 68 are used to help prevent inadvertent contact with terminals 34.

In the embodiment illustrated in FIGS. 1–4, box 8 is generally rectangular with a flat, rectangular back wall 30 may be contoured to facilitate installation through wallboard opening 18 because the depth available is typically limited to the depth of a typical stud, about 3.5 inches (9 cm). As shown in FIG. 5, back 70 of a box 72 is contoured using curved surfaces 74, 76. The curved surfaces 74, 76 may have constant radii or may have varying radii. Also, the contouring may be provided by straight, flat surfaces or by a combination of flat and curved surfaces.

In use, for new construction, box 8 is mounted to stud 24 and electrical outlet device 6 is mounted to standoffs 26. Appropriate knockouts 78 are removed from box 8 and cables 44, 46 are passed into the interior of box 8. Appropriate connections are made with terminals 34 and with wire junctions 36 within wiring cavity 38. After wallboard 20 has been installed, cover plate 10 is mounted to box 8. In retrofit applications box 8, with or without electrical outlet device 6, as appropriate, is passed through wallboard opening 18, with second portion 14 first passing through opening 18 followed by first portion 12. Cables 44, 46 are passed into the interior of box 8. The box continues to be rotated and slid so that second portion 14 passes behind wallboard 20. Once properly in position, box 8 is secured to stud 24. The remainder of the installation generally proceeds as discussed above.

The preferred embodiment is disclosed with second portion 14 being the lower portion. However, box 8 could be mounted in other orientations with second portion 14 being, for example, horizontally aligned with first portion 12 or above first portion 12. Although the embodiment has been disclosed showing a single electrical outlet device 6, the invention may also be practiced with multiple electrical outlet devices. The electrical outlet devices may be of the same type or of different types if codes allow. If desired, outlet plate could also include one or more sliding, pivoting, snap on, or other type of doors or covers. Open region 43 could be illuminated using, for example, low-voltage ambient light-sensitive lights, switched lights or constantly illuminated lights. Box 8 and cover plate 10 are preferably made of one or more materials, typically metal or polymers, having appropriate electrical insulation characteristics.

Wallboard 20 may be of a variety of materials, such as gypsum, wood planks, plywood, wood pulp, polymers, or a combination thereof. The invention encompasses assemblies 2 mounted within walls, ceilings and floors so that the term wallboard, as used herein, encompasses wallboard used for walls and ceilings and also flooring.

Other modification and variation can be made to the disclosed embodiments without departing from the subject of the invention as defined in following claims. For example, the assembly could be mounted to support structures other than studs, such as floor or ceiling joists, and could be mounted to the support structures directly or indirectly, such as through the use of brackets. In some situations, such as when used within a floor, the wallboard may have sufficient structural strength to permit the box to be mounted to the wallboard and not to, for example, a stud or a joist.

Any and all patents, patent applications and printed publications referred to above are incorporated by reference.

What is claimed is:

1. A recessed electrical outlet device box usable with an outlet device and mountable within a wall, the wall of the type comprising wallboard defining open regions behind the wallboard, the box comprising:
   a first portion and a recessed second portion, the first portion having an open front, the second portion being recessed away from the open front;
   the second portion defining a wiring cavity sized to house wire junctions;
   outlet device mounting structure located to permit an outlet device to be mounted within the box; and
   the box sized to permit at least a substantial part of the first portion to be positioned within a first open region behind an opening formed within wallboard of a wall, the open front being generally alignable with the opening in the wallboard, the second portion being positionable within a second open region, the second open region being located below offset from the opening and behind the wallboard.

2. The box according to claim 1 wherein the box is sized to permit the second portion and then at least a substantial part of the first portion to be placed through the opening in the wallboard, whereby the box may be suitable for retrofit installations.

3. The box according to claim 2 wherein the box comprises a back, the back having first and second ends corresponding to the first and second portions, the first and second ends being contoured to facilitate retrofit installations.

4. The box according to claim 1 wherein the first and second portions define the first and second volumes, the second volume being at least 20% of the combined first and second volumes.

5. The box according to claim 1 wherein the first and second portions define the first and second volumes, the second volume being at least 25% of the combined first and second volumes.

6. The box according to claim 1 wherein the first and second portions define the first and second volumes, the second volume being at least 30% of the combined first and second, volumes.

7. The box according to claim 1 wherein the outlet device mounting structure is located to permit an outlet device to be mounted to the box.

8. The box according to claim 7 wherein the box comprises a back and a side barrier extending from the back and into the first portion adjacent to the outlet device mounting structure.

9. The box according to claim 7 wherein the box comprises a back and the outlet device mounting structure comprises standoffs extending from the back.

10. The box according to claim 1 further comprising stud mounting structure.

11. The box according to claim 10 wherein the stud mounting structure comprises a mounting flange.

12. The box according to claim 1 wherein the box is made of a polymer.

13. The box according to claim 1 wherein the first and second portions are upper and lower portions, respectively.

14. A recessed electrical outlet enclosure usable with an outlet device and mountable within a wall, the wall of the type comprising wallboard defining open regions behind the wallboard, the enclosure comprising:
   an electrical outlet device box having a first portion and a recessed second portion, the first portion having an open front, the second portion being recessed away from the open front;
   the second portion defining a wiring cavity sized to house wire junctions;
   outlet device mounting structure located to permit an outlet device to be mounted within the box;
   the box sized to permit at least a substantial part of the first portion to be positioned within a first open region behind an opening formed within wallboard of a wall, the open front being generally alignable with the opening in the wallboard, the second portion being positionable within a second open region, the second open region being located offset from the opening and behind the wallboard; and
   a cover plate comprising a flange portion and a recessed portion, the recessed portion sized to pass through the open front of the first portion and into the first portion, the recessed portion having a base and sidewalls extending between the flange portion and the base, the flange portion sized to extend laterally outwardly of the opening in the wall.

15. The enclosure according to claim 14 wherein the box comprises said outlet device mounting structure so that an outlet device is mountable to the box.

16. The enclosure according to claim 14 wherein the base has an access opening to permit access to an outlet device mountable to the box.

17. The enclosure according to claim 14 comprising one said access opening.

18. A recessed electrical outlet assembly mountable within a wall, the wall of the type comprising wallboard defining open regions behind the wallboard, the assembly comprising:
   an electrical outlet device box having a first portion and a recessed second portion, the first portion having an open front, the second portion recessed away from the open front;
   the first portion comprising outlet device mounting structure;
   an electrical outlet device mounted to the box and within the box through the outlet device mounting structure;
   the second portion defining a wiring cavity sized to house wire junctions, the wire junctions electrically connected to the electrical outlet device;
   the box sized to permit at least a substantial part of the first portion to be positioned within a first open region behind an opening formed within wallboard of a wall, the open front being generally alignable with the opening in the wallboard, the second portion being positionable within a second open region, the second open region being located offset from the opening and behind the wallboard; and
   a cover plate comprising a flange portion and a recessed portion, the recessed portion sized to pass through the open front of the first portion and into the first portion, the recessed portion having a base and sidewalls extending between the flange portion and a base, the flange portion sized to extend laterally outwardly of the opening in the wall, the base having an access opening to permit access to the electrical outlet device.

19. The assembly according to claim 18 comprising one electrical outlet device mounted to the box.

20. A recessed electrical outlet installation comprising:

a wall comprising wallboard, the wall defining a first open region behind an opening formed within the wallboard and a second open region located offset from the opening and behind the wallboard, an electrical outlet device box mounted to the wall and having a first portion and a recessed second portion, the first portion having an open front, the second portion recessed away from the open front;

the first portion comprising outlet device mounting structure;

an electrical outlet device mounted to the box and within the box through the outlet device mounting structure;

the second portion defining a wiring cavity sized to house wire junctions, the wire junctions electrically connected to the electrical outlet device;

at least a substantial part of the first portion of the box positioned within the first open region, the open front being generally aligned with the opening in the wallboard, the second portion being positioned within the second open region; and a cover plate comprising a flange portion and a recessed portion, the recessed portion sized to pass through the open front of the first portion and into the first portion, the recessed portion having a base and sidewalls extending between the flange portion and a base, the flange portion sized to extend laterally outwardly of the opening in the wall to lie adjacent to the wallboard, the base having an access opening to permit access to the electrical outlet device.

21. The installation according to claim 20 wherein the open front is smaller than the opening in the wallboard.

22. The installation according to claim 20 wherein the wallboard comprises gypsum wallboard.

23. The installation according to claim 1 wherein the second open region is located below the opening.

* * * * *